Patented Oct. 7, 1947

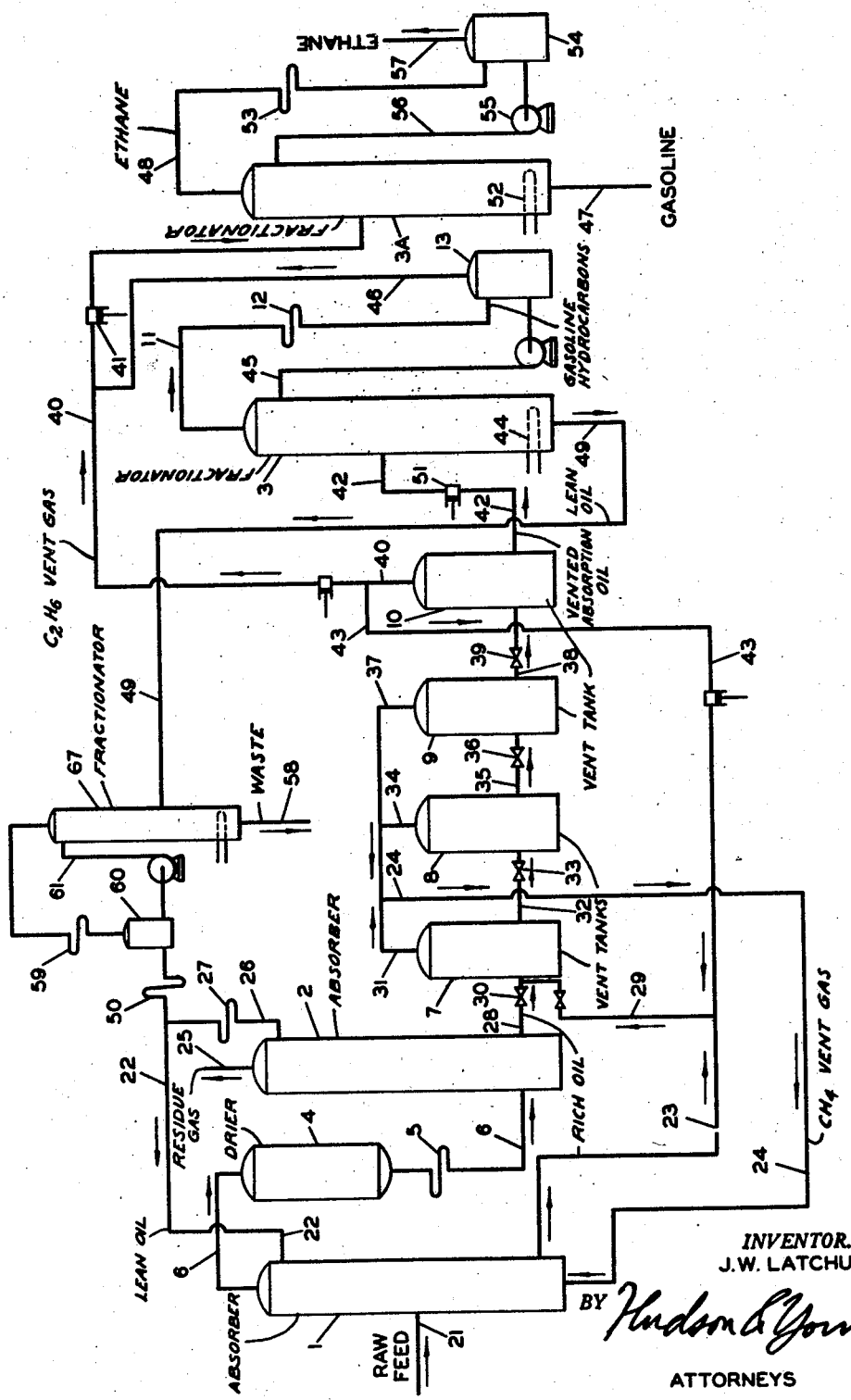

2,428,521

UNITED STATES PATENT OFFICE 2,428,521

RECOVERY OF ETHANE AND GASOLINE FROM NATURAL GAS

John W. Latchum, Jr., Bartlesville, Okla., assignor to Phillips Petroleum Company, a corporation of Delaware Application December 17, 1945, Serial No. 635,589

3 Claims. (Cl. 196—8)

This invention relates to the treatment of hydrocarbons. In one of its more specific aspects it relates to a method for the separation and recovery of ethane from a natural hydrocarbon gas. In a still more limited aspect it consists primarily of a process for the elimination of methane from ethane and heavier constituents present in an absorption plant's rich oil.

In the treatment of natural gas for the separation and recovery of individual hydrocarbons many problems exist. Some of the more difficult problems encountered are those involved in the separation and isolation of such normally gaseous hydrocarbons as ethane or propane from a natural gas or mixture of relatively volatile hydrocarbons containing normally gaseous constituents. It is to the separation and recovery of an ethane product of sufficient purity for many commercial uses that my invention is directed.

One object of my invention is to provide a process for the separation and recovery of an ethane product from a natural gas or other hydrocarbon gaseous mixture containing ethane.

Another object of my invention is to provide a process for the simultaneous separation of ethane and natural gasoline from natural gas.

Still another object of my invention is to provide a process for the substantially complete elimination of methane from the ethane and natural gasoline products during separation of these from natural gas.

Still other objects and advantages will be obvious to those skilled in the art from a careful study of the following disclosure and the attached drawing which respectively describes and illustrates a preferred embodiment of my invention.

The drawing is a schematic flow diagram of a preferred embodiment of my unitary separation system.

Referring now to the drawing, numerals 1 and 2 refer to absorption columns while fractionational distillation columns are identified by numerals 3 and 3A. A drier unit 4 and a cooler 5 are installed in a gas line 6 between the absorption columns 1 and 2 as indicated. Following the absorber 2 are some flash tanks 7, 8, 9 and 10. The fractionator 3 has an overhead vapor line 11 which conveys overhead vapors to a condenser 12 and continues on to a reflux accumulator tank 13.

All pressures stated hereinafter are in terms of pounds per square inch absolute.

In the operation of this equipment according to my process a distillate well fluid or natural or hydrocarbon gas from any other source at a pressure of about 1,000 pounds per square inch and at about 90° F., enters my system by way of a raw gas line 21. This line leads the gas or fluid to be treated to the first absorber vessel 1 at about the latter's midpoint. This absorber operates at substantially the pressure and temperature of the inlet gas. An absorption oil, to be described subsequently, enters the absorber by way of a lean oil line 22 and after becoming enriched with dissolved hydrocarbons leaves the absorber by way of a line 23 and is then termed "rich" or "fat" oil. Gas stripped of its condensible hydrocarbon content at the temperature and pressure of this absorber leaves this vessel through the overhead gas line 6. Entering the tower at a point in the base is a line 24 which carries a dry or moisture-free gas from a source to be explained hereinafter.

In a subsequent step for the absorption of the more volatile hydrocarbons including ethane, the operation is preferably carried out at a relatively low temperature in order to increase the solubility of the gaseous ethane in the absorption oil. In order to carry on an operation, such as an absorption step, at temperatures below the freezing point of water, the absorption oil and the gas to be treated should preferably be relatively dry or free from moisture. The absorption oil should be free from suspended water so that upon cooling or chilling to a temperature below the freezing point of water droplets of ice will not be present. Similarly the gas entering such a step should also be dry since its moisture content would tend to freeze out during the contacting. A further reason for drying the gas to be treated is to prevent hydrate formations in the chiller and pipes leading from the chiller to the absorption vessel.

Substantially any type of drying apparatus desired may be used providing, of course, that it is capable of treating a relatively large volume of gas to the required degree of dryness. I have found that a bauxite dehydrator works well for this purpose. Since some well gases contain appreciable moisture, I have found it advisable to have more than one, for example, two, bauxite dehydrator vessels and to use them alternately; when one is on process, the other is being regenerated or dried.

In order to be able to use the very efficient adsorption type of dehydration catalyst, for best operation I have found the hereinbefore mentioned absorption step should be used. This absorption step carried out at about atmospheric or normal absorption operating temperature is intended mainly to remove the most easily condensible, relatively high boiling hydrocarbons from the gas stream. Said hydrocarbons are easily adsorbed by such adsorbents as the bauxite dehydration adsorbent of vessel 4, and these hydrocarbons tend to poison or to make ineffective the bauxite for moisture removal. Thus, in order to provide for a long operating life of the bauxite dehydration catalyst in vessel 4, I prefer to use an absorption unit or as it might be termed a "preabsorber" to remove the heavy ends from the gas stream prior to the dehydration step. These heavy ends usually comprise aromatic and naphthenic hydrocarbons and on occasion other high carbon to hydrogen ratio compounds such as asphaltenes.

From the dehydrating zone 4 the dry gas passes through the cooler 5 which is adapted to chill the gas to about −30° F. At this temperature the chilled gas is passed into the second absorber vessel 2 which is operated at about the chilled gas inlet temperature. Pressure in this vessel is about the same as in absorber 1, being lower only by the pressure drop experienced in flowing through the line 6, drier 4 and cooler 5. The gas enters this absorber at a point near the bottom, passes upward through the contactors within the vessel and finally leaves through the overhead residue gas line 25 for such disposal as desired. While I have not shown it in the drawing, this cold, dry gas may pass in indirect heat exchange with the dry warm gas prior to passage of the latter through the chiller 5 to assist in reducing refrigeration costs.

Lean absorption oil enters this absorber 2 by way of a lean oil inlet line 26 which discharges the oil upon a top contacting tray. The line 26 carries a refrigeration means 27 for cooling the absorption oil to any desired low temperature, for example, to the −30° F. temperature of this absorber. In this absorber the relatively volatile liquid hydrocarbons and the normally gaseous hydrocarbons, excepting for the most part the methane, are absorbed and carried out as enriched absorption oil or "fat oil." This enriched absorbent passes through the rich oil line 28 and enters the lower portion of the flash tank 7. Just prior to entry into this first flash tank 7 this fat oil stream is joined by the fat oil stream from the base of the first absorber 1. This latter stream flows from its absorber through line 23 and line 29 to join the second fat oil stream from absorber 2 in line 28 just after passage through a pressure reducer 30. This first flash tank is operated at about 500 pounds pressure at about −14° F. This temperature results from the mixing of the warm rich oil stream from absorber 1 and the cold stream from absorber 2 and the mixture passing through the pressure reducer 30. At this pressure in flash tank 7 a considerable proportion of the dissolved methane flashes from the absorption oil and passes out by way of a gas line 31. This vented oil leaves the first flasher through a line 32 containing a pressure reducer 33 and enters a second vent tank 8 at a pressure of about 250 pounds. Evolution of a further quantity of dissolved methane cools the absorption oil to about −17° F., the freed gas passing out through a vent line 34 to join the gas vented from tank 7 in the line 24. This further vented oil passes from the tank 8 through an oil line 35 and pressure reducing valve 36 and enters a third vent tank 9. This tank is operated at about 100 pounds pressure and about −19° F. and the oil on passing through the valve 36 loses a still further quantity of dissolved methane. This methane carries some ethane since the partial pressure of ethane at the operating conditions of tank 9 is appreciable. In addition the vent gases from tanks 8 and 7 also carry some ethane but correspondingly less as their operating pressure is higher than that in tank 9. Thus the vent gas from tank 9 leaves by way of a vent line 37 to join the vent gases from tanks 8 and 7 in line 24.

Since this mixture of vent gases contains some ethane and ethane is one of the desired products of the process, this gas is recycled to the first absorber by suitable recompression means, not shown. This gas is also dry with respect to moisture and being dry it is passed into the absorber 1 at a point in or near the bottom and then passed upward through the entire length of the column. In this manner some little ethane is probably absorbed but the main function of this dry gas in this first absorber is to dry the absorption oil in the latter's passage through the bottom half or drier section of the vessel. The oil needs to be dry or free from moisture to prevent ice and gas-hydrate formation in the vent tank 7. I have found that by operating substantially the lower half of vessel 1 as a moisture stripper, that the rich absorbent oil issuing therefrom is sufficiently dry to cause no moisture freezing or hydrate formation in the vent tank 7.

The moisture removed from the absorbent oil in the lower half of the absorber 1 combined with the moisture coming in with the raw gas to be treated passes overhead from this vessel and is removed from the gas stream by dehydration zone 4. Thus, the gas feed entering the low temperature absorber 2 is thoroughly dried and accordingly the rich oil leaving this absorber is dry. In this manner all inlet material to the sequence of vent tanks is free of moisture.

The three-time vented oil leaves tank 9 through an oil line 38 and passes through still another pressure reducing valve 39 which lowers the pressure to about 30 pounds per square inch (absolute) and enters the final vent tank 10. There is substantially no net temperature drop accompanying this expansion since heat absorption from the atmosphere offsets any decrease due to the expansion. In this tank a large proportion of the gas vented is ethane, a product of the process, and this vent gas passes through a vent line 40, is compressed by a compressor 41 and at a pressure of about 365 pounds per square inch passes on through line 40 extended to the approximate center of a second fractionator column 3A. Any methane contained in this gaseous stream will be included in the final ethane concentrate product since no further separation is herein contemplated. I have found that this amount of methane can be materially decreased by withdrawing a portion of the vent gas from line 40 and passing it through a recycle gas line 43 to join the feed to the several vent tanks 7, 8, 9 and 10. In this manner a further opportunity is at hand for venting some of this methane.

The fully vented absorption oil from the final vent tank 10 passes therefrom through a line 42 and is forced into the fractionator 3 by a pump 51 under a pressure of about 80 pounds per square inch. A reboiler coil 44 furnishes sufficient reboiling heat as to maintain a kettle temperature of about 350° F. This temperature I have found is ample to make a substantially complete separation between hydrocarbons normally included within a natural gasoline boiling range and the absorption oil. Accordingly, the absorption oil is withdrawn from the base of this fractionator through a lean oil line 49 and is fractionated in column 67 to remove tarry matter and overhead lean oil is finally cooled in a cooler 50 to about 90° F. at which temperature the lean oil is suitable for recycling into the first absorber column. Overhead vapors are taken from this column 3 at about 180° F., are cooled in the condenser 12 and enough condensate formed to supply reflux necessary for cooling the top of the tower. The liquid which accumulates in accumulator 13 is pumped through a reflux line 45 into the top of the fractionator. The uncondensed overhead gases which accumulate in the vessel 13 pass by way of a vapor line 46 and are added to the ethane rich gas in line 40. The mixture then is pumped by compressor 41 on through line 40 extended into about the midportion of the second fractionator 3A.

The fractionator 3A is operated at a pressure of about 360 pounds per square inch. A reboiler coil 52 furnishes sufficient heat to maintain a kettle temperature of about 220° F. Under these conditions ethane is driven overhead as a vapor through a line 48. This ethane is cooled in a cooler 53 sufficient to produce reflux liquid which accumulates in the vessel 54. The liquid is pumped by a pump 55 through a reflux line 56 to the top of this tower for refluxing purposes. Gaseous ethane is taken from the system through a product line 57 for such disposal as desired.

Bottoms from this latter fractionator are removed through a bottoms line 47 and sent to a storage vessel, not shown, or to such other disposal as desired.

In case the well effluent being treated according to my process or other charge stock contains high boiling or tarry matter which should not be permitted to accumulate in the absorption oil, this may be removed from the oil by passing the lean absorption oil from the base of column 3 to a separate distillation vessel 67. Upon distillation of the absorption oil the undesired residue may be used for fuel or otherwise disposed of. The distilled and accordingly purified absorption oil is then passed on through the line 22, through cooler 50 and on to absorbers 1 and 2 as hereinbefore described.

It is preferable to distil continuously this absorption oil since any tarry material might tend to congeal in the low temperature steps of my process. Accordingly, then, on reference to the drawing, the hot lean absorption oil from the base of column 3 passes through line 49 into the central portion of an auxiliary column. This column 67 is operated at such a temperature as necessitated to distil over the absorption oil leaving a high boiling, tarry, undesirable waste like material as a residue. This material is withdrawn through a bottoms line 58 and passed to such disposal as desired. Overhead vapors are condensed in a cooler 59, the condensate accumulating in vessel 60. That required for refluxing is pumped through reflux line 61 to the top of the tower while the main purified stream passes through line 22, cooler 50 on to absorber 1 and to chiller 27 and absorber 2.

The several coolers and/or condensers used herein may be merely water cooled heat exchangers, or may be refrigerated chillers, depending upon the service required.

The absorption oil may be any desired type of oil, as, for example, a straight run paraffinic type oil boiling from approximately 200° F. to 350° F., or may be a higher boiling or lower boiling oil as desired. That is, the particular oil used is not necessarily critical.

The following tabulation gives an example of the operation of the process of my invention when applied to the extraction of condensible hydrocarbons and an ethane product from a distillate well production fluid available at a pressure of about 1,000 pounds per square inch and at about atmospheric pressure. The numerical values are pound mols per day of operation when treating 44 million standard cubic feet of well effluent per day.

| Hydrocarbon Component | Gas Feed To— | | Line 24 | Residue Gas Line 25 | Valve 30 | Line 31 |
|---|---|---|---|---|---|---|
| | Absorber 1 | Absorber 2 | | | | |
| $C_1$ | 103,700 | 116,500 | 14,300 | 103,000 | 15,280 | 7,580 |
| $C_2$ | 5,880 | 8,850 | 3,600 | 600 | 12,600 | 1,110 |
| $C_3$ | 2,550 | 2,270 | 200 | | 3,100 | 60 |
| $C_4$ | 1,470 | 860 | | | 1,520 | |
| $C_5$ | 450 | 20 | | | 450 | |
| $C_6$ | 220 | | | | 220 | |
| $C_{7+}$ | 150 | | | | 150 | |
| Abs. Oil | | | | | 22,400 | |

The main function of the absorber 1 is to remove the heavy ends from the gas which is to be dried prior to the low temperature absorption step. If the heavy ends of the gas were not removed, the bauxite dehydrator 4 would become "poisoned" by adsorption of said heavy ends. This poisoning interferes seriously with the dehydrating efficiency of bauxite and I prefer to have all stocks entering the low temperature absorber 2 as dry as possible.

| | Line 34 | Line 37 | Line 40 | Line 46 | Compressor 41 | Gasoline Line 47 | Ethane Conc. Line 57 |
|---|---|---|---|---|---|---|---|
| $C_1$ | 4,380 | 2,370 | 880 | 65 | 189 | | 189 |
| $C_2$ | 1,010 | 1,480 | 4,340 | 4,660 | 5,280 | 80 | 5,200 |
| $C_3$ | 58 | 88 | 406 | 2,490 | 2,550 | 1,650 | 900 |
| $C_4$ | | | 57 | 1,460 | 1,475 | 1,475 | |
| $C_5$ | | | | 450 | 450 | 450 | |
| $C_6$ | | | | 220 | 220 | 220 | |
| $C_{7+}$ | | | | 75 | 75 | 75 | |
| Abs. Oil | | | | | | | |

From a study of the above tabulation it will be observed that a gaseous or fluid feed stock containing a normal amount of ethane and natural gasoline boiling range hydrocarbons may be efficiently separated into an ethane stock and a natural gasoline. An ethane concentrate such as I herein produce should be suitable for cracking to ethylene for the manufacture of ethyl alcohol.

One unique point of my process, and mentioned hereinbefore, is the recycling of the combined dry vent gases from vent tanks 7, 8 and 9 into the base of the absorber vessel to act as a dehydrating agent for the rich absorbent to leave that vessel.

It will be obvious to those skilled in such art that many alterations and modifications of my process may be made, for example recycling the vented vapor from each flash tank to the preceding flash tank or making the temperature level the same or even ascending in place of descending as shown.

For simplicity purposes most valves, pressure regulators and temperature measuring and recording devices and such other auxiliary equipment normally used in such operations have not been expressly shown or described, but the use of these items is well known to those skilled in the art.

Materials of construction may be selected from among those commercially available since special materials or specially constructed vessels or pipes, etc., are not needed.

The operational details given, such as temperatures, pressures and the like, may be varied by those skilled in the art and yet obtain results similar to those herein given. For example, the raw gas may be available at a pressure other than 1,000 pounds per square inch, either higher or lower, and under such conditions then the pressures, etc., at some other points of my process may be varied accordingly and yet obtain about the same overall result. For example, if feed gas is avialable at say 1,200 pounds pressure, both absorbers may be operated at about this pressure, and the vent tank 7 may be operated at 500 to 700 pounds, and the other vent tanks at corresponding pressures. Likewise the two fractionator towers 3 and 4 may be operated at the pressures and temperatures given or may be varied some.

Having disclosed my invention, I claim:

1. A process for treating a natural hydrocarbon gas for the separation of an ethane product and a natural gasoline product comprising the steps of contacting the gas with an absorption oil at approximately atmospheric temperature to produce a treated gas substantially free of high boiling natural gasoline boiling range hydrocarbons and containing some moisture and a rich absorption oil containing said last mentioned hydrocarbons, treating this contacted gas stream with a dehydrating means, chilling the resulting dry gas and contacting said chilled dry gas with a chilled absorption oil to produce a treated gas substantially free from ethane and higher boiling hydrocarbons and a cold rich absorption oil containing said ethane and higher boiling hydrocarbons, removing said treated gas as one product of the process; combining the two rich absorption oils and passing the combined oils to a venting zone, venting dissolved gas substantially lighter than the desired ethane and removing the vented absorption oil from said venting zone and passing same to a fractionation zone, from this latter zone separating an ethane concentrate and a natural gasoline product as products of the process and recycling a portion of the remaining absorption oil as the first mentioned absorption oil, chilling the remaining portion of the absorption oil and recycling this chilled absorption oil as the first mentioned chilled absorption oil; and removing the ethane concentrate and the natural gasoline product as the main products of the process.

2. The method of claim 1 wherein the vented gas substantially lighter than the desired ethane is contacted with the first mentioned rich absorption oil to remove moisture therefrom prior to combining of the two rich absorption oil streams.

3. A process for producing a moisture free ethane concentrate and a moisture free natural gasoline product from a distillate well effluent containing some moisture comprising passing the well effluent containing some moisture into the mid section of a contacting zone having an inlet end and an outlet end with respect to absorption oil flow, introducing absorption oil into the inlet end of said zone, introducing a subsequently produced dry vent gas substantially lighter than the desired ethane product into the outlet end of said zone and removing dry rich absorption oil from the outlet end of said zone and removing a combined stream of well effluent gas and vent gas containing moisture from the inlet end of said contacting zone and contacting this combined gas stream with a dehydrating adsorbent, chilling the so contacted gas stream and passing the chilled gas into an absorption zone in contact with a chilled absorption oil for absorption of ethane and natural gasoline boiling range hydrocarbons, removing contacted gas as a residue gas product of the process, combining said chilled absorption oil containing said ethane and natural gasoline boiling range hydrocarbons and aforesaid dry rich absorption oil and passing said combined oils to a venting zone and venting therefrom dry dissolved gas substantially lighter than the desired ethane and recycling same to the first mentioned contacting zone as said subsequently produced dry vent gas; passing the so vented absorption oil to a distillation zone and removing therefrom an ethane concentrate and a natural gasoline product as the main products of the process, and an absorption oil bottoms, and recycling a portion of this absorption oil to the first stated contacting zone, chilling the remaining portion and recycling this chilled portion as the first mentioned chilled absorption oil.

JOHN W. LATCHUM, Jr.

REFERENCES CITED

The following references are of record in the file of this patent:

UNITED STATES PATENTS

| Number | Name | Date |
|---|---|---|
| 2,181,633 | Hutchinson | Nov. 28, 1939 |
| 2,337,254 | Legatski et al. | Dec. 21, 1943 |
| 2,290,957 | Hachmuth | July 28, 1942 |
| 2,262,201 | Ragatz et al. | Nov. 11, 1941 |
| 2,297,675 | Dayhuff et al. | Oct. 6, 1942 |